April 13, 1943. W. O. HAMPTON ET AL 2,316,420
TERMINATOR
Filed June 9, 1938 2 Sheets-Sheet 1
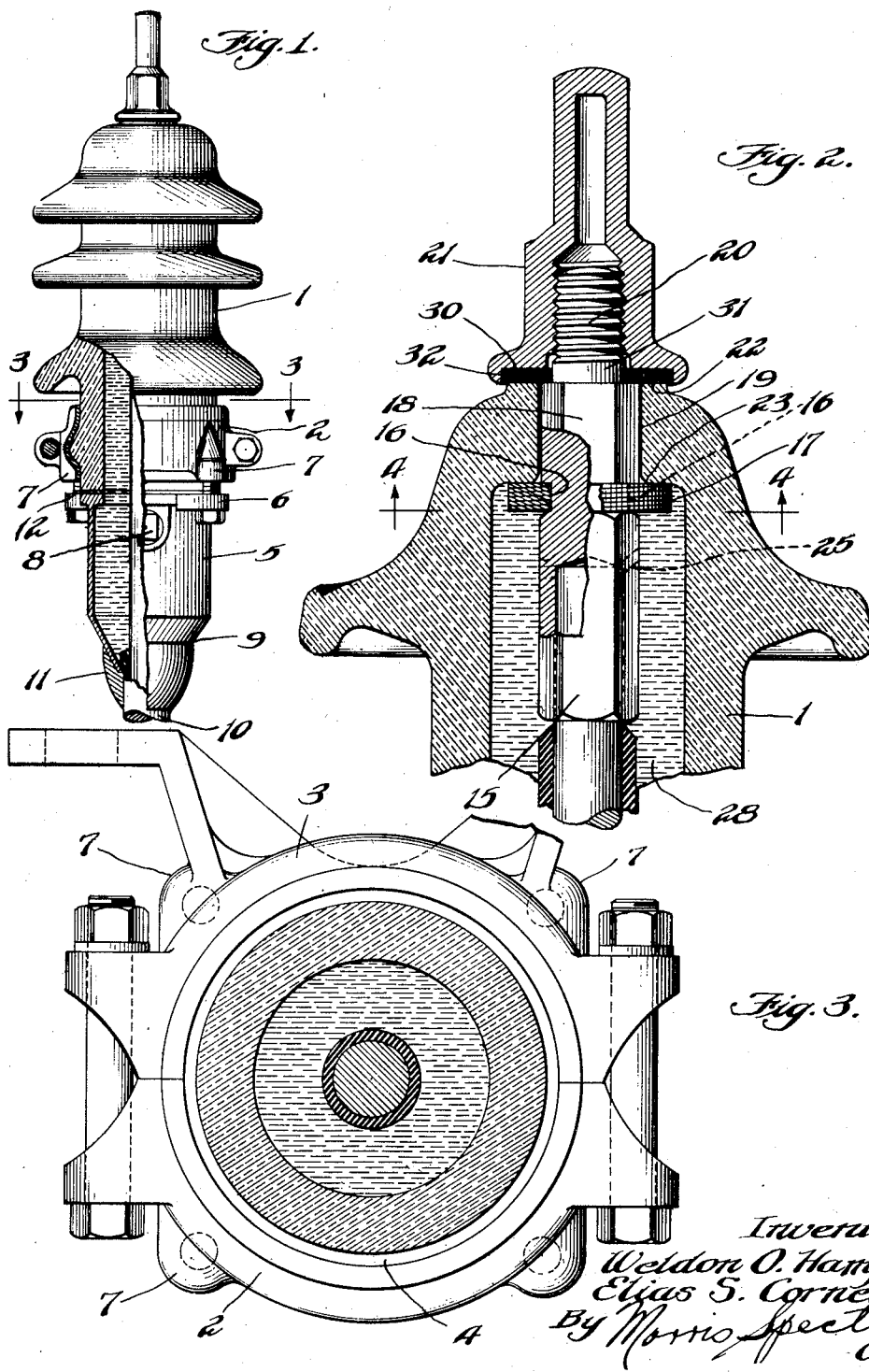

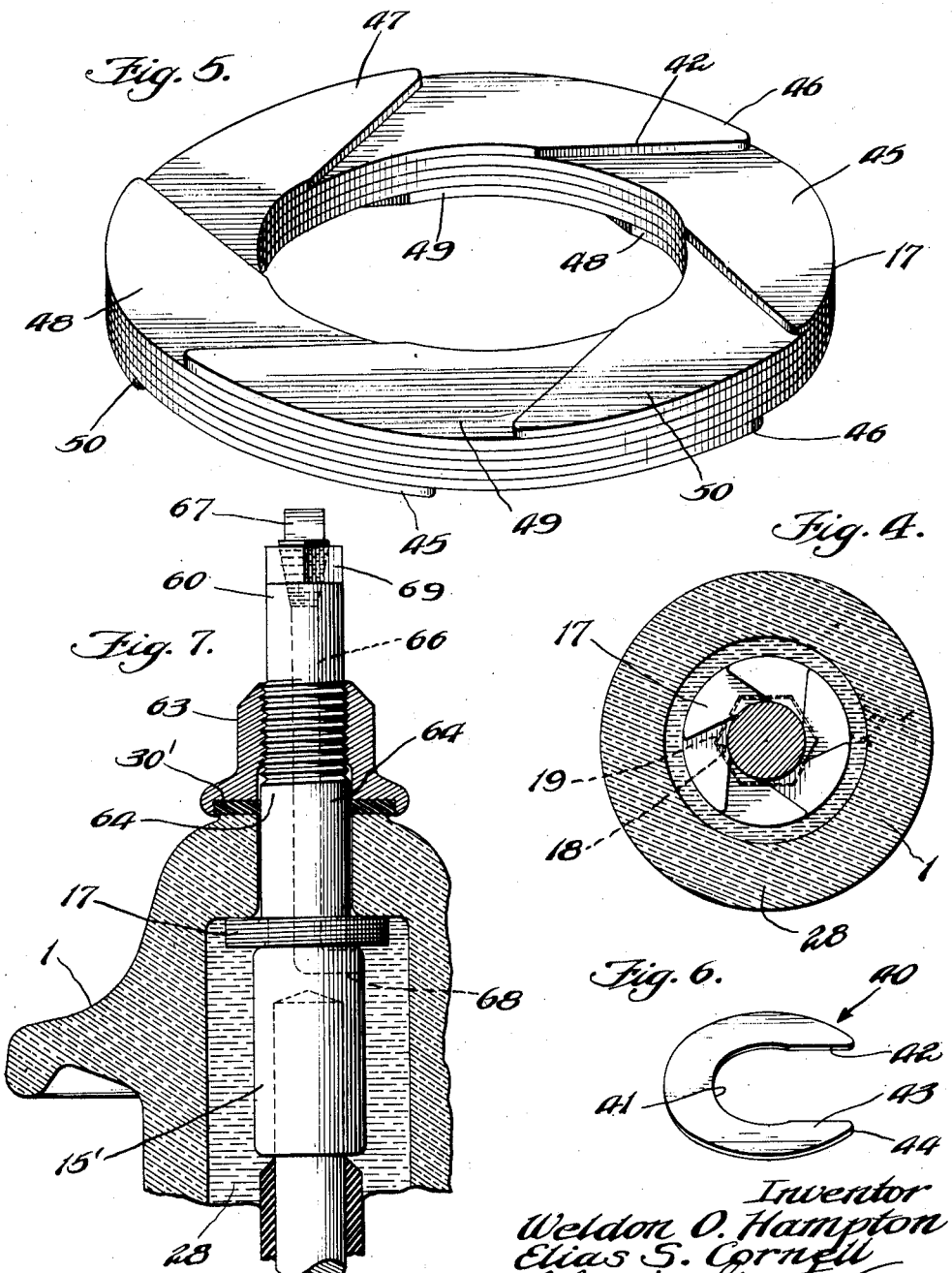

Patented Apr. 13, 1943

2,316,420

UNITED STATES PATENT OFFICE 2,316,420

TERMINATOR

Weldon O. Hampton, Chicago, and Elias S. Cornell, Evanston, Ill., assignors to The Delta Star Electric Company, Chicago, Ill., a corporation of Illinois Application June 9, 1938, Serial No. 212,778

6 Claims. (Cl. 174—75)

This invention relates to terminators or potheads.

A terminator is a structure used for terminating the end of an underground cable and establishing electrical connections between the end of the conductor thereof and an overhead line. The terminator generally comprises a hollow insulator, or bushing, to the lower end of which the underground cable is secured with the conductor extending therethrough to a point adjacent the upper end of the terminator where it is electrically and mechanically connected to a stud, or the like. The stud extends through the top of the terminator and constitutes the means for extending a circuit to or from the cable. The hollow interior of the terminator is filled with insulating oil or insulating compound and must be maintained tight against the entrance of air or moisture into the terminator. As a terminator is subjected to changing temperatures, due to change in ambient temperature and due to change in electrical load, and as the cable itself is being heated or cooled by like causes, there is an expansion or contraction of the insulating oil or compound within the terminator. During times when there is an appreciable load on the cable and consequent heating thereof, the oil or compound expands, and space must therefore be allowed for such expansion. At times when the cable is comparatively lightly loaded, and the ambient temperature is also reduced, there is a contraction of the insulating oil or compound. The terminator must provide an adequate seal against the entrance of air or moisture from the outside when the oil or compound contracts and draws a partial vacuum within the terminator. Rubber gaskets have heretofore been provided for effecting such sealing action. As the pressure within the terminator is alternately increased and decreased due to expansion and contraction of the contents of the terminator during the twenty-four hour daily period, there is an alternate increase and decrease in pressure upon the rubber gaskets. This alternate change in pressure together with weathering and ageing results in a rapid loss of elasticity of the rubber, which condition is aggravated by the presence of oil or compound in contact with the rubber. Once the rubber loses its elasticity it ceases to constitute an effective seal against air or moisture being drawn into the interior of the terminator from the atmosphere by a vacuum that may be established within the same, and the gasket also then fails to act as a seal against the loss of insulation from the interior of the terminator. It is one of the objects of the present invention to provide means which will yield as the elasticity of the rubber decreases, said means yielding to such a degree as to maintain the rubber gaskets under compression even after there has been an appreciable loss of elasticity. This result is accomplished by providing a spring washer which is under a great pressure and serves to maintain the rubber gasket under compression even though there may be relative displacement of the stud 15 with respect to the insulator.

It is a further object of the present invention to provide a terminator and stud assembly which are so related that the stud is non-rotatable within the terminator. As a result, a nut on the outside of the stud may be drawn tight by an operator using a single wrench. Heretofore, in many types of terminators, it was necessary for the operator to use two wrenches, one for holding the stud against turning and the other for turning the nut on the stud.

It is a still further object of the present invention to provide a stud assembly that is so constructed and arranged that it may be clamped to the head of the terminator insulator and be maintained in alignment with the central axis of the insulator even though the plane of the upper surface of the insulator to which the stud is secured is not exactly parallel with the plane of the lower surface of the insulator head to which the stud is secured. This result is attained by using a spring washer in connection with one or more rubber gaskets on one or both sides of the portion of the insulator head to which the terminator stud is secured.

It is a further object of the invention to provide clamping means for a terminator stud which when clamped will provide a pressure and vacuum seal against the loss of insulating compound or the ingress of air or moisture, and which when not clamped in position will permit venting of the terminator as the same is being filled with insulating oil or compound. This result is obtained by a construction including a spring washer which has sufficient spacing between parts thereof to permit movement of air therethrough from the interior of the terminator insulator before the parts are clamped tight.

It is a still further object of the present invention to provide a spring washer or gasket of the above character which may be assembled upon the terminator stud in a simple manner, even though the effective diameter of the portion of the stud around which the spring gasket fits is less than the effective diameter of adjacent parts of the stud above and below, which would otherwise prevent slipping of a circular gasket lengthwise over the stud into position. The spring gasket of the present invention comprises a plurality of flat bronze discs, of generally U-shape, so that each disc may be slipped into a position embracing the stud. The discs are of spring material and are assembled in a stack around the stud in intertwined relationship so that each disc extends spirally around the stack through somewhat less than one complete turn, and by the consequent distortion of the respective discs the entire stack constitutes a spring.

The attainment of the above and further objects of the present invention will be apparent from the following specification taken in conjunction with the accompanying drawings forming a part thereof.

In the drawings:

Figure 1 is a plan view of a terminator embodying the principles of the present invention;

Figure 2 is an enlarged longitudinal sectional view of the top portion of the terminator of Figure 1;

Figure 3 is a sectional view taken along the line 3—3 of Figure 1 and looking in the direction of the arrows;

Figure 4 is a fragmentary sectional view taken on the line 4—4 of Figure 2;

Figure 5 is a perspective view of a spring washer assembly used in the terminator of Figure 1;

Figure 6 is a perspective view of one of the discs of the washer assembly of Figure 4; and Figure 7 is a fragmentary view corresponding to Figure 2 and illustrating another embodiment of the present invention.

Reference may now be had more particularly to the embodiment of the invention illustrated in Figures 1, 2 and 3. The terminator here shown comprises an insulating bushing 1 in the form of a hollow body of wet process porcelain which is clamped in place by a split clamp 2—3 of a construction shown more particularly in Figure 3. The split clamp embraces the lower part of the insulating bushing, with a flat copper braid 4 between the clamp and the porcelain. The two clamp portions 2—3 are drawn tightly together into contact, firmly clamping the insulator in place and forming a continuous metallic ring around the porcelain. A wiping sleeve or other suitable entrance fitting 5 is secured to the split clamp by means of four bolts extending through lugs 6 on the wiping sleeve 5, which bolts are threaded into four sockets 7 formed in the split clamp 2—3. The wiping sleeve has a filling opening 8 which may be closed by a plug threaded into the opening. The wiping sleeve is tapered at its bottom, as indicated at 9, and a lead covered cable 10 extends into the bottom of the wiping sleeve and is sealed thereto by a wiping joint 11. A gasket 12 provides a seal between the bottom of the porcelain, which is ground smooth, and a top flange on the wiping sleeve 5.

The insulated conductor within the cable 10 is bared of insulation at its upper end where it fits into a bore in a stud 15 preferably of hard drawn copper, bronze or other suitable metal of high electrical conductivity. The stud 15 has a groove extending around the same, as indicated at 16, for receiving a spring washer assembly 17 of a construction to be more fully described as this description proceeds. The upper portion 18 of the stud 15 is non-circular in cross section, preferably hexagonal, and extends through a similarly shaped non-circular hole 19 in the insulator bushing 1 so that the stud is non-rotatable in the bushing. The hexagonal hole 19 in the insulator is very slightly larger than the portion 18 of the stud so that the top part of the stud may pass therethrough easily. The stud is screw threaded above the hexagonal portion 18 as indicated at 20, for receiving a nut, such as a hood nut 21. The top of the nut constitutes a terminal for receiving a clamp lug for attaching a line or other conductor. The top surface 22 on the outside of the insulator dome and the top surface 23 on the inside of the insulator dome are preferably flat surfaces approximately parallel and approximately at right angles to the axis of the insulator bushing. Both the flatness of the surfaces and their angularity with respect to the longitudinal axis of the insulator are made approximately as above stated, within the limits of normal porcelain manufacturing operations. A slight inclination of the surfaces 22 or 23, or both of them, with respect to one another or with respect to a plane perpendicular to the longitudinal axis of the insulator bushing is of no consequence.

In assembling the terminator of Figure 1 the bared end of the cable conductor is inserted into the stud 15 and soldered in place by pouring solder through a soldering hole 25. Before or after the soldering operation the spring washer assembly 17 is assembled around the stud. The cable conductor with the stud in place is then inserted through the bottom of the insulator bushing 1, into the bushing until the top of the stud extends through the top of the bushing, and with the spring washer assembly bearing against the surface 23 of the bushing. The wiped joint 11 to the wiping sleeve is then made. Thereafter the interior of the bushing 1 is filled with insulation 28 through the filling opening 8. The insulation may be oil or a compound that has been heated to give it the necessary fluidity. As the oil rises in the bushing 1 the air therein is expelled by flow through the washer and through the small amount of space between the hexagonal stud and the corresponding hole 19 in the bushing. When the bushing has been filled with insulation 28, a sealing gasket 30 of rubber or the like is slipped over the threaded portion 20 of the stud until the gasket rests on the surface 21 of the bushing. The threads 20 of the stud terminate a short distance from the part 18 thereof, leaving a short cylindrical portion 31 to prevent fouling of the gasket 30 against the threads. Before the oil or compound cools the hood nut is threaded over the threads 20 on the stud and drawn tight. During the tightening operation the stud is held against turning by the sides of the hexagonal hole 19 of the bushing. As a result it is possible to draw the nut 21 tight without the use of a holding wrench for holding the stud against turning. The bottom of the hood nut 21 is provided with a flange 32 around the periphery thereof which is adapted to embrace the periphery of the gasket 30 rather closely, thus confining the gasket against flowing radially outward as the nut 21 is clamped tightly on the stud 15. The nut 21 is then tightened on the stud to draw the stud upwardly and thereby compress the spring washer 17 and the gasket 30. The gasket 30 is thus forced into intimate firm engagement with the top surface 18 of the bushing and provides an oil, vacuum and water-tight seal at the top of the insulator bushing 1. At the same time the spring washer 17 is placed under great pressure. Thereafter as the temperature of the insulator bushing varies and there is a resulting variation in the amount of contraction or expansion of the various parts of the terminator assembly the spring washer assembly takes up any contraction or expansion that might otherwise substantially alter the pressure on the rubber gasket 30 so that as a result of the presence of the spring washer 17 the pressure on the rubber gasket 30 is never entirely relieved. By maintaining the pressure on the rubber gasket continuously, rather than intermittently, the life of the gasket is considerably increased since the gasket will retain its resiliency a much longer time. This is of particular importance in connection with a confined rubber gasket, such as the gasket 30.

Reference may now be had more particularly to Figures 5 and 6 which illustrate the construction of the spring washer assembly 17. The spring washer assembly consists of a number of similar discs 40 of bronze or other resilient non-magnetic material. Each disc is preferably, but not necessarily, flat and is of a generally U-shape and has a central opening 41 of a diameter slightly greater than that of the shank portion 16 to be embraced by the assembly. Each disc has a slot formed therein and defined by sides 42—43 of the disc. These sides terminate at their outer periphery in rounded corners 44 and at their inner periphery they are substantially tangent to the curve 41. The distance between the parallel sides 42—43 is sufficient to permit the disc to embrace the shank portion 16 of the stud. The disc 40 is placed in position to embrace the stud 15 at the shank 16, and similar discs are similarly placed around the shank 16 one at a time. In the instance illustrated in Figure 4 there are six such discs used, as illustrated at 45, 46, 47, 48, 49 and 50. The discs are intertwined so that each disc extends spirally around the assembly from the top to the bottom thereof. The edges 42 of the respective discs at the top surface are uniformly spaced around the top of the assembly and the corresponding edges 43 are also similarly spaced around the bottom of the assembly. The assembly thus constitutes a laminated spring washer having six ratchet like teeth at the top thereof and a similar number of ratchet like teeth at the bottom thereof. It is the teeth that engage the surface 23 of the insulator. If the surfaces 22 and 23 are not exactly parallel or if either or both of these surfaces are not exactly at right angles to the longitudinal axis of the insulator, this spring assembly can maintain the stud and gasket in proper angular position for effecting a proper seal.

In he construction above described it is apparent that when the hood nut is tightened to compress the rubber gasket it will also compress the spring washer assembly 17. Thereafter, should the portion of the stud 15 between the spring washer and the hood nut expand by an amount more than the expansion of the portion of the insulator bushing between them, due to thermal changes, there will be a corresponding expansion of the spring washer assembly. This expansion of the spring washer assembly will not be enough to relieve the spring washer assembly of all of the initial tension thereon. As a result the spring washer assembly will maintain the hood nut 21 in pressure engagement with the rubber gasket 30. Therefore the pressure on the rubber gasket 30 is never entirely relieved. The same action takes place as the rubber of the gasket 30 deteriorates or sets in its compressed condition. The spring washer assembly maintains the hood nut in pressure engagement with the gasket as the gasket sets. As a result of this construction the gasket is always under compression, even if there should be a substantial deterioration of the rubber. The rubber gasket, therefore always maintains the water-tight, vacuum-tight, oil-tight seal.

Reference may now be had more particularly to the construction illustrated in Figure 7. This construction differs from that of Figure 2 primarily in that the stud 15' is adapted to receive a non-hood nut in place of the hood nut 21 of Figure 2. In this construction the stud 15' extends appreciably above the top of the insulator bushing 1 and is provided with a portion 60 for receiving the connection with an aerial or other conductor. In this construction the rubber gasket 30' serves to maintain an oil vacuum and water-tight seal around the top of the bushing 1, and in addition serves to seal against a like flow through the spacing between the threads 15 and the threads on a nut 63 that is threaded over the stud 15. The gasket is therefore made to fit more closely around the portion 64 of the stud so that upon the tightening of the nut 63 and consequent axial compression of the gasket, which is confined at its outer periphery, there will be an expansion of the gasket radially inwardly into firm embracing relationship to the portion 64 of the stud. The rubber gasket 30 thus forms a seal around the periphery of the stud against the entrance of air or moisture into the bushing by creepage between the threads on the bushing and the threads on the nut 63. This type of stud is provided with a central bore 66 which may be closed by a threaded plug 67. The entire assembly may be clamped tight and, with the plug 67 removed, the bushing may be filled with insulating oil or compound 28. During this filling operation the air within the bushing escapes through the bore 66 which opens on the interior of the insulator bushing. It is, however, preferable to perform the filling operation before the nut 63 has been clamped tight, since such filling operation permits the venting of all gases from the interior of the insulator bushing 1 even at a level above the opening 68 of the bore 66. If the portion of the stud 15' that extends through the body of insulation 1 happens to be circular in cross section it is provided with a square or other polygonal part 69 for receiving a wrench to hold the stud against turning as the nut 63 is being tightened.

In compliance with the requirements of the patent statutes we have here shown and described a preferred embodiment of our invention. It is, however, to be understood that the invention is not limited to the precise construction here shown, the same being merely illustrative of the principles of the invention. What we consider new and desire to secure by Letters Patent is:

1. A stud having a groove formed around the same, and a spring washer assembly surrounding the stud at said groove and projecting outwardly of the stud as a peripheral flange, said assembly having a central opening through which the stud extends, which opening is of a diameter greater than the diameter of the stud at the groove and less than the diameter of the stud above and below the groove, said assembly comprising a plurality of intertwined spring metal members each of which has one end at the top of the assembly and one end at the bottom of the assembly with the ends of adjacent members displaced angularly with respect to one another.

2. In a device of the class described, a member having a groove formed around the same, and a spring washer assembly surrounding the member at said groove and including a plurality of intertwined spring metal discs each of which embraces the member and extends spirally of the member through an angle less than 360°, said assembly having a central opening through which the member extends, which opening is of a diameter greater than the diameter of the member at the groove and less than the diameter of the member above and below the groove.

3. Apparatus of the class described comprising a hollow body having an opening therethrough, an electric terminal stud extending through said opening and having a smooth cylindrical portion immediately above the body, means for sealing against the entry of air or moisture into said body around the stud, said means comprising a gasket resting on said body and surrounding the stud, means clamping the gasket against said body and compressing said gasket axially into pressure engagement with the stud to form a pressure sealing fit around the cylindrical portion of the stud and prevent flowing of the gasket material radially inwardly, said stud having means supporting the gasket between the housing and the cylindrical part of the stud, means confining the gasket against flow radially outwardly, said clamping means and said body covering substantially the entire opposite surfaces of the gasket to prevent flowing of the gasket material under the continuous pressure to which it is subjected, and spring means compressed by the clamping means an amount in excess of the amount that the gasket material can set and maintaining the gasket under pressure continuously.

4. In a device of the class described, a member having a groove formed around the same, and a spring washer assembly surrounding the member at said groove and including a plurality of intertwined spring metal discs each of which has a central opening and an opening from the central opening to the outer periphery of the disc and each of which embraces the member and extends spirally of the member through an angle less than 360°, said assembly having a central opening through which the member extends, which opening is of a diameter greater than the diameter of the member at the groove and less than the diameter of the member above and below the groove.

5. A pothead comprising a housing of insulation having a stud receiving opening formed therein and a gasket receiving surface surrounding the opening, a stud extending through the opening and having a cylindrical portion outside of said housing and of a diameter substantially less than the diameter of the opening, a yieldable gasket surrounding the stud and resting on the gasket receiving surface of the insulation and extending up to the cylindrical portion of the stud, means in the space between the body of insulation and the cylindrical portion of the stud and terminating in a surface which is flush with and a continuation of the gasket receiving surface of the insulation and extends from the gasket receiving surface to the cylindrical portion of the stud whereby said second mentioned surface supports the portion of the gasket between the periphery of the stud receiving opening in the insulation and the cylindrical portion of the stud, the stud being screw threaded outside of the housing and with the bottom of the threads terminating at said cylindrical portion and above the housing by an amount substantially in excess of the thickness of the gasket, means threaded on the stud and covering substantially the entire top surface of the gasket and compressing the gasket against the gasket receiving surface, and means confining the outer periphery of the gasket against flow.

6. A pothead comprising a housing of insulation having a stud receiving opening formed therein and a gasket receiving surface surrounding the opening, a stud extending through the opening and having a cylindrical portion outside of said housing and of a diameter substantially less than the diameter of the opening, a yieldable gasket surrounding the stud and resting on the gasket receiving surface of the insulation and extending up to the cylindrical portion of the stud, means in the space between the body of insulation and the cylindrical portion of the stud and terminating in a surface which is flush with and a continuation of the gasket receiving surface of the insulation and extends from the gasket receiving surface to the cylindrical portion of the stud whereby said second mentioned surface supports the portion of the gasket between the periphery of the stud receiving opening in the insulation and the cylindrical portion of the stud, the stud being screw threaded outside of the housing and with the bottom of the threads terminating at said cylindrical portion and above the housing by an amount substantially in excess of the thickness of the gasket, a spring flange projecting from the periphery of the stud on the inside of the pothead, means covering substantially the entire top surface of the gasket and including a part threaded on the stud and compressing the gasket against the gasket receiving surface and drawing the spring flange against the housing, and means confining the outer periphery of the gasket against flow, the spring flange being flexed out of its normal position an amount greater than the maximum amount the gasket can set whereby the spring maintains the gasket under pressure even if the gasket permanently sets.

WELDON O. HAMPTON.
ELIAS S. CORNELL.